(12) United States Patent
Yu et al.

(10) Patent No.: US 8,665,304 B2
(45) Date of Patent: Mar. 4, 2014

(54) ESTABLISHING 3D VIDEO CONFERENCE PRESENTATION ON 2D DISPLAY (75) Inventors: Yang Yu, San Diego, CA (US); Eric Yam, San Diego, CA (US); Seungwook Hong, San Diego, CA (US)

(73) Assignee: Sony Corporation, Tokyo (JP)

( * ) Notice: Subject to any disclaimer, the term of this patent is extended or adjusted under 35 U.S.C. 154(b) by 326 days.

(21) Appl. No.: 13/052,445

(22) Filed: Mar. 21, 2011

(65) Prior Publication Data

US 2012/0242777 A1 Sep. 27, 2012

(51) Int. Cl.
*H04N 7/14* (2006.01)

(52) U.S. Cl.
USPC ........................ 348/14.01; 709/204

(58) Field of Classification Search
USPC ........... 348/14.01–14.08; 455/556.1; 382/285
See application file for complete search history.

(56) References Cited

U.S. PATENT DOCUMENTS

| | | | |
|---|---|---|---|
| 2008/0170806 A1* | 7/2008 | Kim | 382/285 |
| 2008/0268899 A1* | 10/2008 | Lee | 348/14.02 |
| 2011/0234760 A1* | 9/2011 | Yang et al. | 348/46 |

* cited by examiner

*Primary Examiner* — Maria El-Zoobi
(74) *Attorney, Agent, or Firm* — John L. Rogitz; John M. Rogitz (57) ABSTRACT

A 3D video conferencing system includes two cameras at each of two video conferencing locations. Images from the two cameras are exchanged between the locations and are combined at the receiving location in accordance with the angle at which the viewer at the receiving location is viewing an otherwise 2D display to give the illusion of depth perception.

14 Claims, 6 Drawing Sheets

FIG.3
TOP VIEW
SHOWING VIEWING
ANGLE θ

$$\frac{T'}{T} = \frac{\tan\theta - \tan\alpha}{2\tan\theta}$$

DISPARITY MAP: $d = x^A - x^B$

FROM TRIANGULATION: $Z = \dfrac{fT}{x^A - x^B} = \dfrac{fT'}{d'}$

NEW DISPARITY MAP: $d' = \dfrac{T'd}{T} = \dfrac{\tan\theta - \tan\alpha}{2\tan\theta} d$

ESTABLISHING 3D VIDEO CONFERENCE PRESENTATION ON 2D DISPLAY

FIELD OF THE INVENTION

The present application is directed to establishing a three dimensional video presentation on a two dimensional display.

BACKGROUND OF THE INVENTION

Three dimension video presentation refers to video display technology that enhances the illusion of depth perception, typically through various uses of stereoscopic photography. As understood herein, it would be desirable to provide an effective way to present what seems to be 3D video on a legacy 2D screen.

SUMMARY OF THE INVENTION

A method for presenting three dimensional (3D) video includes receiving, at a first display system, at least first and second images from a second display system. The first and second images are taken simultaneously with each other by respective first and second imaging devices associated with the second display system. The method includes determining a viewing angle of a viewer of the first display system. The viewing angle is established by a normal from the viewer to a display plane of a display of the first display system and a direction of view of the viewer relative to the normal. The first and second images are combined using the viewing angle to render a combined image, which is presented on the display of the first display system.

In some embodiments the first image is offset from the second image according to the viewing angle and overlaid thereon. The first image may be offset from the second image according to a trigonometric function of the viewing angle. The first display system can include a TV and the imaging devices may be video cameras. The first display system can include first and second imaging devices and the method may further include sending images from the first and second imaging devices of the first display system to the second display system.

In another aspect, a video presentation system includes a video display, a processor controlling the video display, and a first imager communicating with the processor and oriented to generate a first image of a viewer of the video display. Also, a second imager communicates with the processor and is oriented to generate a second image of the viewer of the video display. A communication interface communicates with the processor and sends the first and second images to a video presentation partner system.

In another aspect, a 3D video conferencing system includes two cameras at a first video conferencing location and two cameras at a second video conferencing location communicating with the first video conferencing location. Images from the two cameras of the first video conferencing location are sent to the second video conferencing location and combined at the second video conferencing location in accordance with the angle at which a viewer at the second video conferencing location is viewing an otherwise 2D display at the second video conferencing location to give the illusion of depth perception. Likewise, images from the two cameras of the second video conferencing location are sent to the first video conferencing location and combined at the first video conferencing location in accordance with the angle at which a viewer at the first video conferencing location is viewing a display at the first video conferencing location.

The details of the present invention, both as to its structure and operation, can best be understood in reference to the accompanying drawings, in which like reference numerals refer to like parts, and in which:

DETAILED DESCRIPTION OF THE PREFERRED EMBODIMENT

Figure 1:
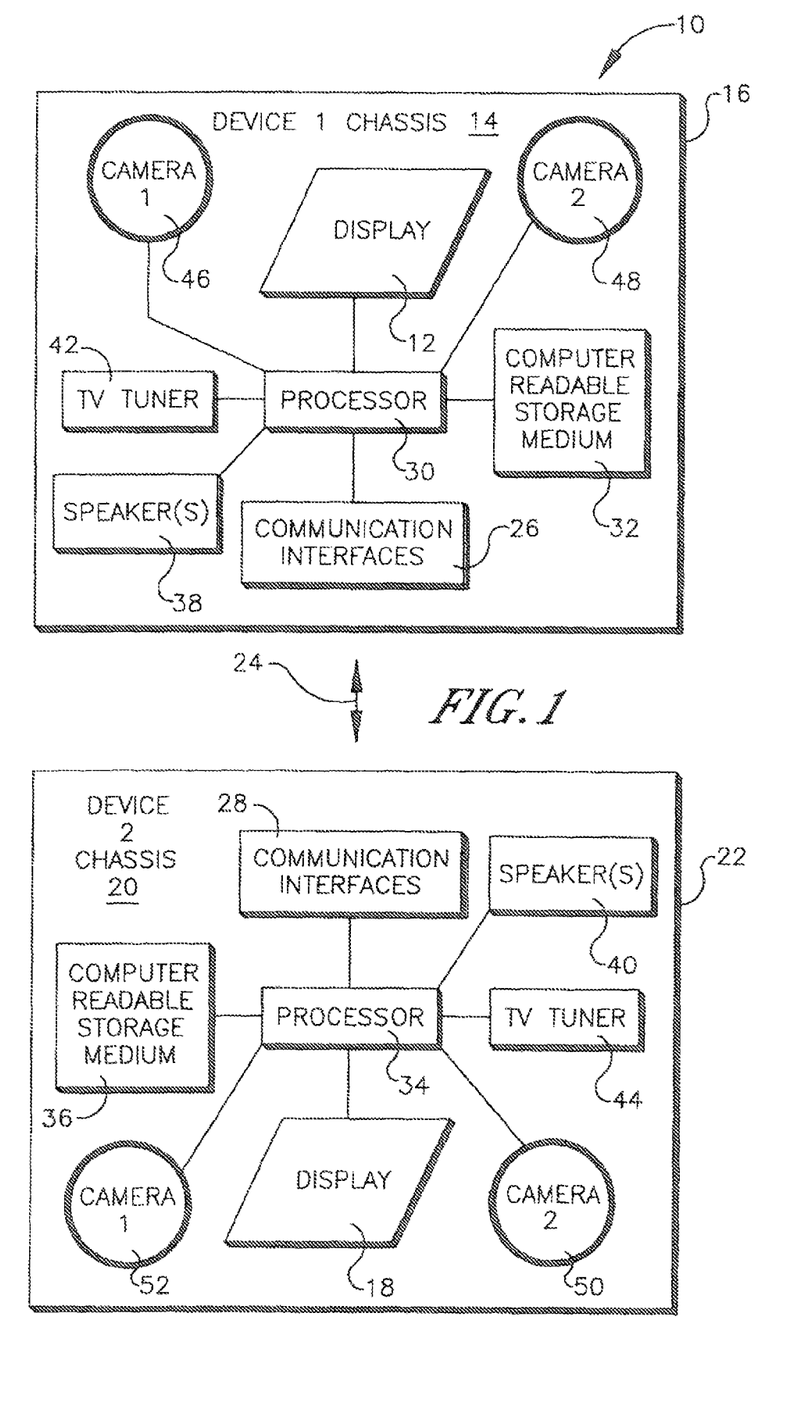
FIG. 1 is a block diagram of a preferred non-limiting system in accordance with present principles.

Referring initially to FIG. 1, a system is shown, generally designated 10, which includes a video display 12 that may be a 2D display mounted on a chassis 14 of a first video conferencing device 16, which is disposed at a first location. Similarly, a video display 18 that may be a 2D display can be mounted on a chassis 20 of a second video conferencing device 22, which is disposed at a second location. The devices 16, 22 communicate with each other over a wired and/or wireless link 24 by means of respective communication interfaces 26, 28 to effect two-way video conferencing in accordance with principles set forth further below. Communication between the devices 16, 22 may employ, without limitation, code division multiple access (CDMA), global system for mobile communication (GSM), time division multiple access (TDMA), wideband CDMA (W-CDMA), space division multiple access (SDMA), frequency division multiple access (FDMA), and orthogonal frequency division multiplexing (OFDM) principles known in the art to effect wireless communication. WiFi, WiMax, and similar technologies may also be used. Combinations of the above technologies may be used.

As shown, the display 12 of the first device 16 communicates with a processor 30 accessing a computer readable medium 32 that stores logic for executing various methods discussed herein. Likewise, the display 18 of the second device 22 may communicate with a processor 34 accessing a computer readable medium 36 that may store logic for executing various methods discussed herein. The various computer readable media disclosed herein may be solid state media, disk-based media, or other appropriate media, fixed or removable in their respective components. The processors 30, 34 communicate with their respective communication interfaces 26, 28 and may output audio information on respective speakers 38, 40 that may be mounted on the respective chassis 14, 20. When the devices 16, 22 are established by TVs, each may include a respective TV tuner 42, 44 communicating with the respective processor 30, 34.

FIG. 1 also shows that left and right imagers 46, 48 may be associated with the first device 16 and may be mounted on the chassis 14. The imagers 46, 48 may be mounted at the same height on the chassis staggered along the x-axis established by the display 12. The imagers 46, 48 may be established by video camera, and communicate with the processor 30. Similarly, imagers 50, 52 may be associated with the second device 22 and may communicate with the processor 34 of the second device 22.

Figure 2:
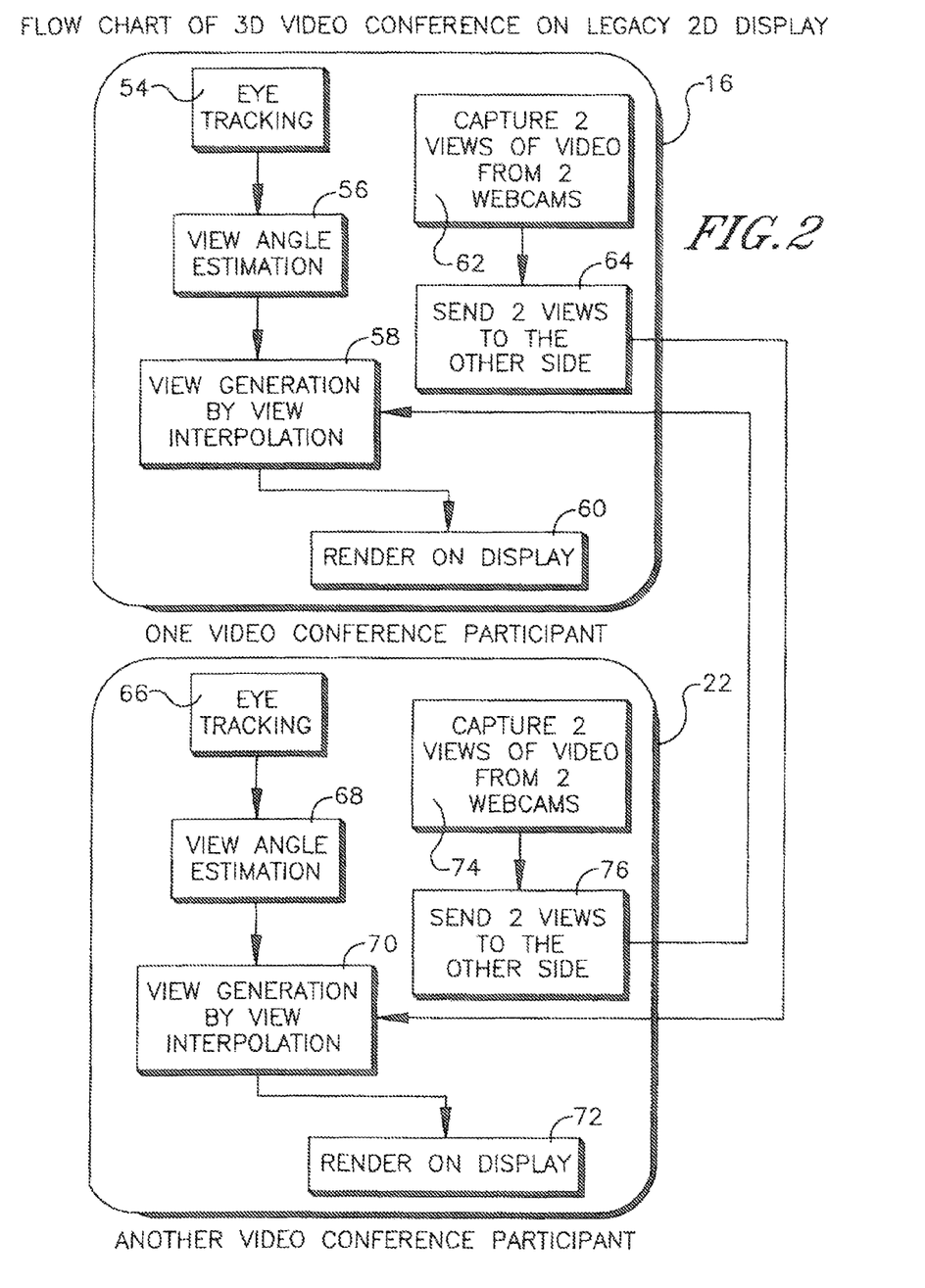
FIG. 2 is a flow chart of example logic in accordance with present principles.

FIG. 2 shows logic that may be executed by the processor 30, 34. Commencing at block 54, the processor 30 of the first device 16 receives information from or both of the cameras 46, 48 of the first device 16 representing eye tracking information of a viewer of the display 12 of the first device 16. At block 56 the processor determines a viewing angle "θ" (FIG. 3) at which the viewer, schematically shown at "V" in FIG. 3, views the display 12. When more than a single viewer is imaged, the most prominent viewer, e.g., the one whose image is the largest, may be used for determining the viewing angle θ.

Figure 3:
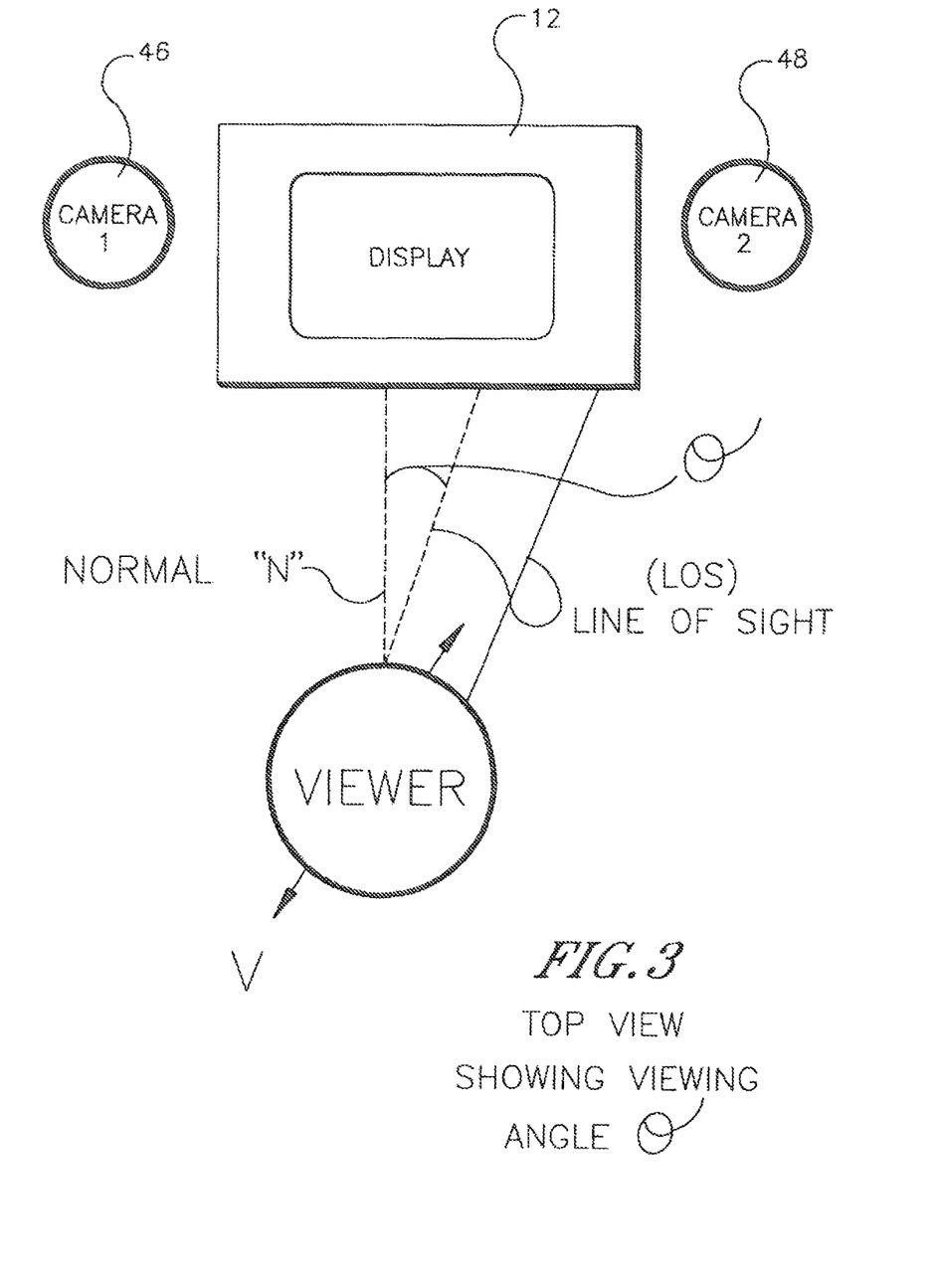
FIG. 3 is a top schematic view illustrating a viewer's eye angle "θ" with respect to the normal from the viewer to the plane of the display.

In one embodiment the viewing angle θ may be the angle between the normal "N" between the viewer and the display and the line of sight "LOS" from the viewer's eyes to the display 12. The viewing angle may be determined from an image of the viewer's head, and may represent the angle the pupils of the eye are turned from the normal "N", the angle of the viewer's head relative to the normal "N", or the sum of the angle of the head relative to the display plus the angle of the eyes relative to the head. The viewing angle θ may be determined using eye recognition/image recognition modeling engines.

Proceeding to block 58, images from the cameras 50, 52 of the second device 22 are received and combined by the processor 30 of the first device 16 according to the viewing angle θ of the viewer of the first device, then at block 60 the combined image is presented on the display 12 of the first device 16. The images received from the cameras 50, 52 are images of the same object, typically, the viewer of the second device 22, taken simultaneously from the two different perspectives of the cameras 50, 52. Also, at block 62 the first device 16 captures simultaneous images of the viewer of the first device 16 and sends the images to the second device 22 at block 64.

Processing at the second device 22 may be patterned similarly to processing described above at the first device 16. Accordingly, at block 66, the processor 34 of the second device 22 receives information from or both of the cameras 50, 52 of the second device 22 representing eye tracking information of a viewer of the display 18 of the second device 22. At block 68 the processor 34 determines the viewing angle of the viewer of the second device 22 in accordance with principles above.

Proceeding to block 70, images from the cameras 46, 48 of the first device 16 that first device sent to the second device at block 64 are received at the second device 22 and combined by the processor 34 of the second device 22 according to the viewing angle of the viewer of the second device 22, then at block 72 the combined image is presented on the display 18 of the second device 22. The images received from the cameras 46, 48 are images of the same object, typically, the viewer of the first device 16, taken simultaneously from the two different perspectives of the cameras 46, 48. Also, at block 74 the second device 22 captures simultaneous images of the viewer of the second device 22 and sends the images to the first device 16 at block 76 for use by the first device at block 58.

Without limitation, one device can combine the two images from the other device in accordance with the viewing angle of a viewer of the first device by offsetting one image from the second image according to the viewing angle, then overlaying/superimposing the first image onto the second image. This offset may be according to a trigonometric function of the viewing angle.

With more specificity, one image may be moved onto the other image from the other device but offset by the viewing angle, so that, for instance, if the viewing angle is five degrees to the right of centerline, one image is offset from the other by five degrees and then superimposed on the other image. The opposite offset would occur if the viewing angle is five degrees to the left of centerline.

Or, the two images from the other device may be blended in accordance with a preexisting blending algorithm, except that the amount of blending is modified by, e.g., the sine of the viewing angle. For instance, if a preexisting blending algorithm blends two images by extracting 50% of the pixels from one image and 50% of the pixels from another image and then combining the extracted pixels, and the viewing angle is five degrees to the right of centerline, then (50%−50%*sine 5) would be extracted from one image and (50%+50%*sine 5) would be extracted from the other image and then the pixels combined. The image providing the greater number of pixels is the image on the side of centerline toward which the viewing angle is oriented. Other ways to alter image superimposition using the viewing angle may be used.

Figure 4:
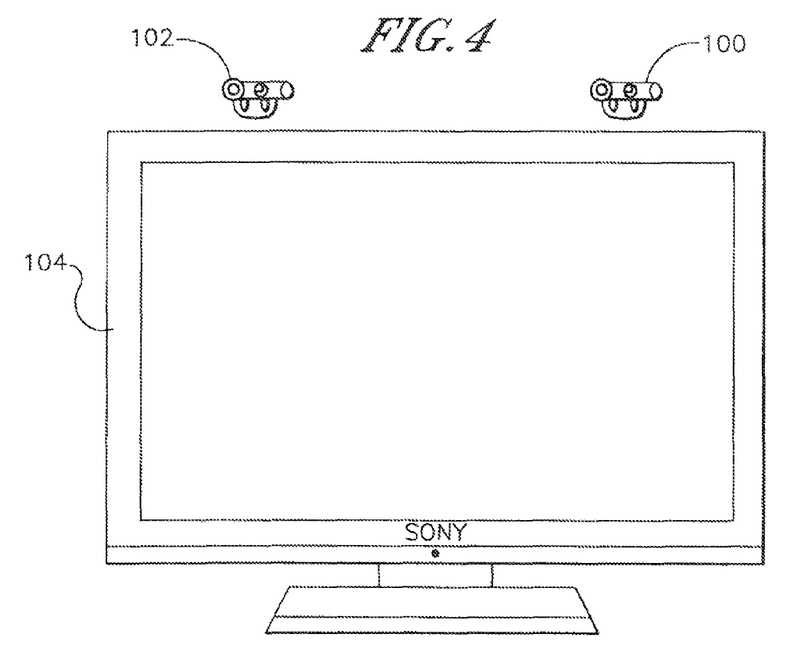
FIGS. 4-7 are schematic diagrams illustrating certain details of obtaining eye angle and modifying disparity based thereon.
Figure 5:
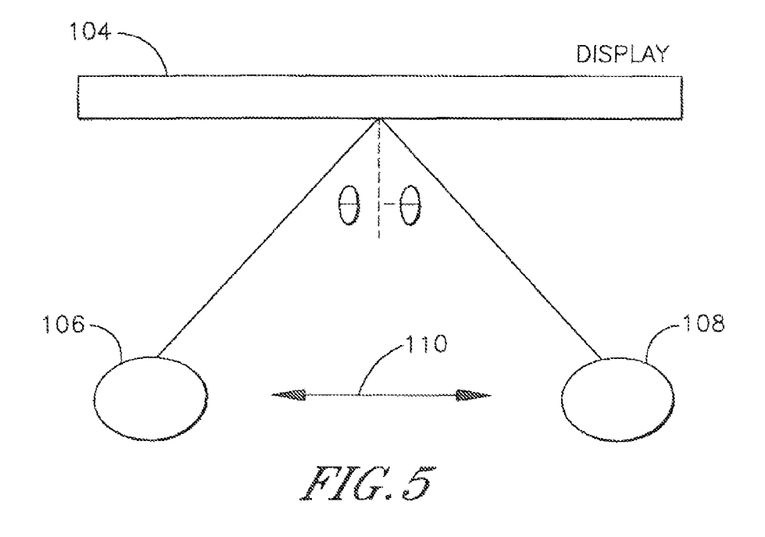

FIGS. 4-7 are schematic diagrams to further illustrate the above principles. In FIG. 4, two cameras 100, 102 are mounted along the same horizontal (in this case, along the top edge) of a video display 104, preferably straddling the centerline of the display as shown. FIG. 5 shows that the limits of viewer position with respect to the display 104 for calculation purposes may be limited to a left position 106 and a right position 108 defining respective maximum viewing angles±θ as shown. When the viewer is located at left limit position 106, the image from the left camera 102 exclusively may be presented on the receiving display (not shown), whereas when the viewer is located at right limit position 108, the image from the right camera 100 exclusively may be presented on the receiving display. Thus, when the viewer is at either limit position 106, 108 no combining of images from the cameras 100, 102 is implemented. On the other hand, when the viewer is located (shown by the line 110) between the limit positions 106, 108, the below-described interpolation is undertaken to alter the disparity map discussed further below.

Figure 6:
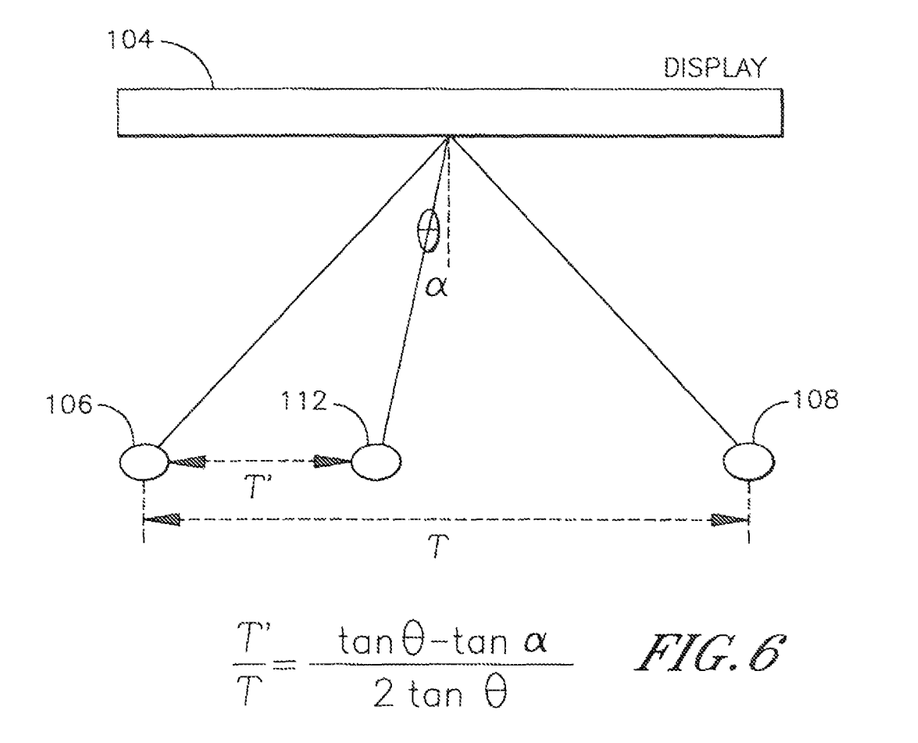
Figure 7:
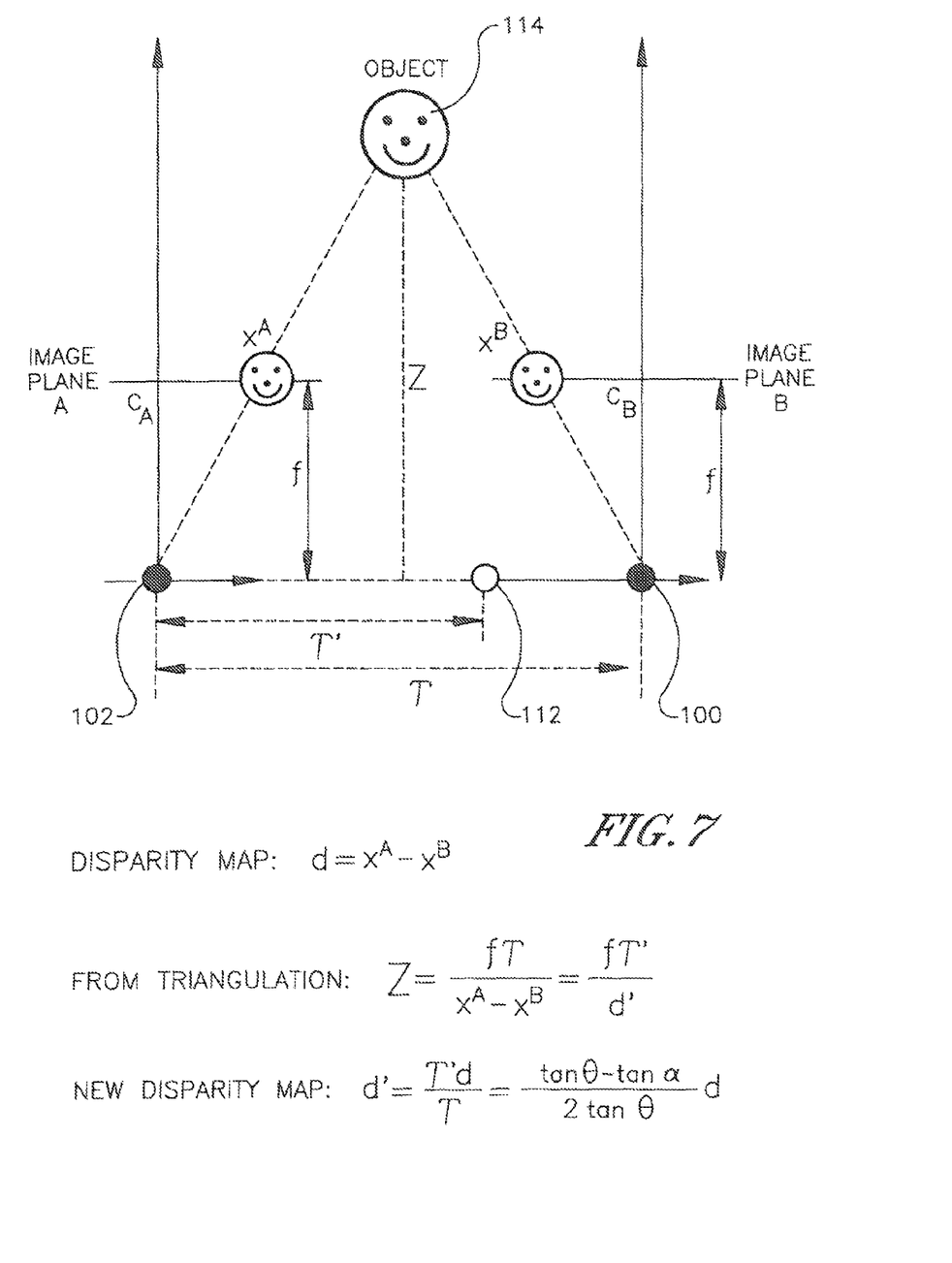

With more specificity and now turning to FIGS. 6 and 7, as shown in FIG. 6 when the viewer is at position 112, the distance between the limit positions 106, 108 is "T", and the distance between the viewer position 112 and the limit position closest to the viewer (in the example shown, the left limit position 106) is "T'", with θ defining the angle between the perpendicular to the center of the display 104 and the limit position closest to the viewer and a defining the angle between the perpendicular to the center of the display 104 and a line from the viewer position 112 to the center of the display 104, then $$\frac{T'}{T} = \frac{\tan\theta - \tan\alpha}{2\tan\theta}.$$

Now with the above relationship in mind consider FIG. 7, in which the viewer position 112 has been transformed straight toward the display along a perpendicular thereto to the line extending between the cameras 100, 102 as shown, for illustration purposes only, with "object" 114 representing the person being imaged (albeit shown, for illustration only, somewhat centered relative to the cameras). If "f" is the focal length of each camera 102, 100 then the corresponding image planes at the focal lengths are shown at "image planes" A and B in FIG. 7. The lines "Ca" and "Cb" represent the centerlines of the fields of views of the cameras 102, 100, i.e., the center of projections of the cameras. It will readily be appreciated that points Xa and Xb represent the points on the respective image planes at which the image of the object 114 is located. Assuming the cameras 100, 102 are horizontally aligned as described above, then corresponding pixel rows of the cameras 100, 102 are also aligned with each other, e.g., the fifth row of pixels of the camera 100 is horizontally aligned with the fifth row of pixels of the camera 102, and so on. Then, the disparity map for each pixel is given by $$d = x^A - x^B$$

Also, from triangulation, $$Z = \frac{fT}{x^A - x^B} = \frac{fT'}{d'}$$

The new disparity map d' is thus given by $$d' = \frac{T'd}{T} = \frac{\tan\theta - \tan\alpha}{2\tan\theta}d$$

Figure 8:
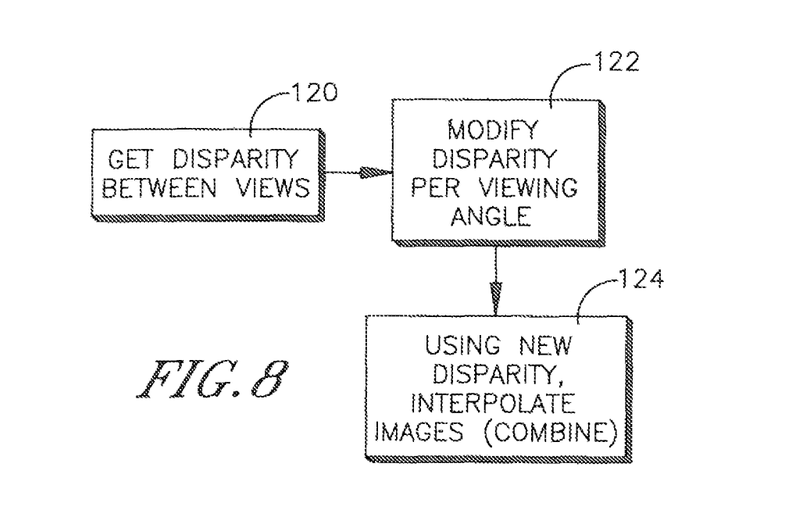
FIG. 8 is a flow chart of example logic based on FIGS. 4-7.

With the above in mind, FIG. 8 shows that at block 120, the disparity, i.e., the two dimensional vector between the positions of corresponding camera images is obtained according to principles known in the art, see, for examples,
Scharstein et al, *A taxonomy and evaluation of dense two-frame stereo correspondence algorithms, International Journal of Computer Vision,* 47(1/2/3):7-42, April-June 2002; *Microsoft Research Technical Report MSR-TR-2001-81,* November 2001; and http://vision.middlebury.edu/stereo/.

Moving to block 122, the disparity map is modified using the viewing angle to arrive at d' according to the above disclosure, effectively to calculate a new disparity map for the image at the viewer's current position described above. Then at block 124 using the new disparity map the images are interpolated and combined according to image disparity combination principles referenced above.

While the particular ESTABLISHING 3D VIDEO CONFERENCE PRESENTATION ON 2D DISPLAY is herein shown and described in detail, it is to be understood that the subject matter which is encompassed by the present invention is limited only by the claims.

What is claimed is:

1. A method for presenting three dimensional (3D) video useful for video conferencing, comprising:
   receiving at a first display system at least first and second images from a second display system, the first and second images being taken simultaneously with each other by respective first and second imaging devices associated with the second display system;
   determining a viewing angle of a viewer of the first display system, the viewing angle being the angle formed at the junction of a perpendicular line from the viewer to a display plane of a display of the first display system and a line of sight from the viewer to the display system;
   combining the first and second images at least in part using the viewing angle to render a combined image; and
   presenting the combined image on the display of the first display system.

2. The method of claim 1, wherein the first image is offset from the second image according to the viewing angle and overlaid thereon.

3. The method of claim 2, wherein the first image is offset from the second image according to a trigonometric function of the viewing angle.

4. The method of claim 1, wherein the first display system includes a TV.

5. The method of claim 1, wherein the imaging devices are video cameras.

6. The method of claim 1, wherein the first display system comprises first and second imaging devices and the method further comprises sending images from the first and second imaging devices of the first display system to the second display system.

7. A 3D video conferencing system, comprising:
   two cameras at a first video conferencing location;
   two cameras at a second video conferencing location communicating with the first video conferencing location;
   images from the two cameras of the first video conferencing location being sent to the second video conferencing location and combined at the second video conferencing location in accordance with the angle at which a viewer at the second video conferencing location is viewing an otherwise 2D display at the second video conferencing location to give the illusion of depth perception; and
   images from the two cameras of the second video conferencing location being sent to the first video conferencing location and combined at the first video conferencing location in accordance with the angle at which a viewer at the first video conferencing location is viewing a display at the first video conferencing location.

8. The system of claim 7, wherein the two images from the respective two cameras of the second video conferencing location are offset from each other, then combined, and presented on the display at the first video conferencing location according to the angle at which the viewer at the first video conferencing location is viewing the display at the first video conferencing location.

9. The system of claim 7, wherein the two images from the respective two cameras of the second video conferencing location are offset from each other, then combined, and presented on the display at the first video conferencing location according to a trigonometric function of the angle at which the viewer at the first video conferencing location is viewing the display at the first video conferencing location.

10. The system of claim 7, wherein the display at the first video conferencing location includes a TV.

11. A 3D video conferencing system, comprising:
   two cameras at a first video conferencing location;
   at least one processor at the first video conferencing location;
   at least one computer readable storage medium at the first video conferencing location and bearing instructions which when executed by the processor configure the processor to execute logic comprising:
   receiving images from at least two cameras at a second video conferencing location communicating with the first video conferencing location;
   sending images from the two cameras of the first video conferencing location to the second video conferencing location for combination at the second video conferencing location in accordance with the angle at which a viewer at the second video conferencing location is viewing an otherwise 2D display at the second video conferencing location to give the illusion of depth perception; and
   combining the images from the two cameras of the second video conferencing location in accordance with the angle at which a viewer at the first video conferencing location is viewing a display at the first video conferencing location.

12. The system of claim 11, wherein the processor when executing the instructions is configured to combine two images from the respective two cameras of the second video conferencing location, the two images from the respective two cameras of the second video conferencing location being offset from each other, the processor when executing the instructions being configured to present a combination of the two images from the respective two cameras of the second video conferencing location on the display at the first video conferencing location according to the angle at which the viewer at the first video conferencing location is viewing the display at the first video conferencing location.

13. The system of claim 11, wherein the processor when executing the instructions is configured to combine the two images from the respective two cameras of the second video conferencing location which are offset from each other, the processor when executing the instructions being configured to present a combination of the two images from the respective two cameras of the second video conferencing location on the display at the first video conferencing location according to a trigonometric function of the angle at which the viewer at the first video conferencing location is viewing the display at the first video conferencing location.

14. The system of claim 11, wherein the display at the first video conferencing location includes a TV.

* * * * *